United States Patent [19]

Baney

[11] 4,310,482

[45] Jan. 12, 1982

[54] HIGH YIELD SILICON CARBIDE PRE-POLYMERS

[75] Inventor: Ronald H. Baney, Midland, Mich.

[73] Assignee: Dow Corning Corporation, Midland, Mich.

[21] Appl. No.: 171,552

[22] Filed: Jul. 23, 1980

[51] Int. Cl.³ .............................................. F27B 9/04
[52] U.S. Cl. ............................... 264/65; 260/37 SB; 427/350; 427/387; 423/344; 423/345; 428/446; 428/447; 428/429; 501/88; 528/12; 528/18; 528/35; 556/430; 556/431
[58] Field of Search ............................ 264/65; 106/44; 423/344, 345; 528/12, 18, 35; 427/350, 387; 428/446, 447, 429; 260/37 SB; 556/430, 431

[56] References Cited

U.S. PATENT DOCUMENTS

| | | | |
|---|---|---|---|
| 3,853,567 | 12/1974 | Verbeek | 106/44 |
| 4,052,430 | 10/1977 | Yajima et al. | 556/431 |
| 4,105,455 | 8/1978 | Koga et al. | 106/44 |

*Primary Examiner*—Melvyn I. Marquis
*Attorney, Agent, or Firm*—Robert L. McKellar

[57] ABSTRACT

Novel, high yielding prepolymers are prepared by reducing chloropolysilanes with lithium aluminum hydride. These prepolymers exhibit good handling properties and are useful for preparing ceramics, silicon carbide ceramic materials and articles containing silicon carbide.

10 Claims, No Drawings

HIGH YIELD SILICON CARBIDE PRE-POLYMERS

BACKGROUND OF THE INVENTION

The concept of preparing silicon carbide ceramic materials or filled ceramics from silicon carbide ceramic materials. As applied to the preparation of silicon carbide-containing ceramics from the degradation of polymers, any number of published articles or issued patents have appeared.

Yajima in U.S. Pat. No. 4,052,430, issued Oct. 4, 1977, has described the preparation of polycarbosilanes prepared by pyrolyzing the polysilanes generated by the reaction of sodium or lithium metal with dimethyldichlorosilane. These polycarbosilanes can be heated to yield beta-silicon carbide.

West and Maszdiazni reported in the 22 nd AFOSR Chemistry Program Review FY77, R. W. Heffner ed. March (1978), that a polymer, made by reacting dimethyldichlorosilane with methylphenyldichlorosilane and an alkali metal, could be fired at high temperatures to yield whiskers of beta-silicon carbide.

Verbeek has shown in U.S. Pat. No. 3,853,567, the preparation of a mixed ceramic of silicon carbide and silicon nitride by pyrolyzing a polysilazane. In addition, Verbeek has prepared a polycarbosilane suitable for molding by heating organosilicon polymers optionally mixed with silicon dioxide or organic polymers at a temperature between 400° C. and 1200° C.

Rice et al., in U.S. Pat. No. 4,097,794 issued June 27, 1978, have suggested that almost anything containing silicon can be pyrolyzed to give a ceramic material.

Baney, in U.S. patent application Ser. No. 910,247, filed May 30, 1978, now abandoned, and continued as a continuation-in-part, Ser. No. 024,137, filed Mar. 26, 1979, now abandoned and continued as a continuation-in-part, Ser. No. 135,567, filed Mar. 31, 1980, discloses a methylhalopolysilane which can be fired at 1200° C. or higher to yield fine grain beta-silicon carbide. The yields and handling characteristics of these latter polysilanes are enhanced over the prior materials.

Mention should be made of recent Japanese patent publications 80500/78 and 101099/78 in the name of Takamizawa et al. These publications deal with polymers made from methylchlorodisilanes but no mention is made of the yields of ceramic material generated by the decomposition of the disilane. Recent publications by Nakamura (Japanese Kokais 79/114600 and 79/83098 suggest that the preparation of silicon carbide precursor polymers having a silicon carbon (Si-C-Si-) backbone are prepared by heating organosilicon compounds (including $(CH_3)_3SiSi(CH_3)_2Cl$) in the presence of B, Al, Si, Ge, Sn and Pb compounds or HI and its salts, at high temperatures.

It has been determined that high yields of silicon carbide ceramic materials and filled ceramics can be obtained by the methods and the new materials of the instant invention.

THE INVENTION

This invention consists of a method of preparing a polysilane having the average formula $$\{(CH_3)_2Si\}\{CH_3Si\} \qquad (I)$$

in which polysilane there is from 0 to 60 mole percent $(CH_3)_2Si$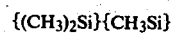units and 40 to 100 mole percent $CH_3Si$ units, wherein the remaining bonds on silicon are attached to either another silicon atom or a hydrogen atom such that the polysilane contains from 0.3 to 2.1 weight percent of hydrogen attached to silicon, based on the weight of the polysilane which method consists of (A) reducing a polyhalosilane having the average formula $$\{(CH_3)_2Si\}\{CH_3Si\} \qquad (II)$$

in which there is from 0 to 60 mole percent $(CH_3)_2Si\equiv$ units and 40 to 100 mole percent $CH_3Si\equiv$ units, wherein the remaining bonds on silicon are attached to either another silicon atom, a chlorine atom or a bromine atom such that the polysilane contains from 10–43 weight percent, based on the weight of the polysilane, of hydrolyzable chlorine or 21–62 weight percent based on the weight of the polysilane of hydrolyzable bromine, with at least a stoichiometric quantity, based on the halogen present, of a reducing agent, under anhydrous conditions, at a temperature of from 0° to 120° C. for a period of from 4 to 48 hrs., in a suitable solvent, and (B) thereafter recovering the polysilane (I).

This invention also deals with a composition of matter consisting essentially of a polysilane having the average formula $$\{(CH_3)_2Si\}\{CH_3Si\}$$

in which polysilane there is from 0 to 60 mole percent $(CH_3)_2Si\equiv$ units and 40 to 100 mole percent $CH_3Si\equiv$ units, wherein the remaining bonds on silicon are attached to either another silicon atom or a hydrogen atom such that the polysilane contains from 0.3 to 2.1 weight percent of hydrogen attached to silicon, based on the weight of the polysilane. Preferred are polysilanes having 70 to 100 mole percent $CH_3Si$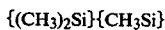 units. Also preferred are polysilanes containing 0.35 to 0.45 weight percent of hydrogen attached to silicon based on the weight of the silicon-hydrogen containing silane.

Further, this invention deals with shaped articles made from the polysilanes, with, or without fillers, and a method by which the shaped articles are obtained.

This invention also consists of a method of preparing silicon carbide ceramic materials which consists of heating a polysilane having the average unit formula $$\{(CH_3)_2\}\{CH_3Si\}$$

in which polysilane there is from 0 to 60 mole percent $(CH_3)_2Si\equiv$ units and 40 to 100 mole percent $CH_3Si$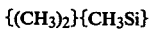 units, wherein the remaining bonds on silicon are attached to either another silicon atom or a hydrogen atom such that the polysilane contains from 0.3 to 2.1 weight percent of hydrogen attached to silicon, based on the weight of the polysilane, in an inert atmosphere or in a vacuum to an elevated temperature in the range of 700° C. to 1600° C. until the polysilane is converted to silicon carbide.

The inventions described herein represent an improvement over the art, in that, higher yields of silicon carbide ceramic materials are obtained upon pyrolysis of the polysilanes and polysilanes herein are much easier and safer to handle because the replacement of the halogen substitutents with—H radicals limits hydrolysis to a certain extent and thus reduces the quantity of corrosive HCl or HBr gas liberated.

This invention results from replacing halogen atoms on the above described polyhalosilanes with hydrogen, the resulting product, upon pyrolysis, gives silicon carbide ceramic materials.

The methylpolysilane starting materials (II) are those set forth and described in the Baney application Ser. No. 910,247, filed May 30, 1978, now abandoned and continued as a continuation-in-part, Ser. No. 024,137, filed Mar. 26, 1979, now abandoned and continued as a continuation-in-part as Ser. No. 135,567, filed Mar. 31, 1980, which are hereby incorporated by reference. The starting materials are those described in the Baney application which consists of 10-43 weight percent, based on the weight of the polysilane, of hydrolyzable chlorine or 21-62 weight percent, based on the weight of the polysilane, of hydrolyzable bromine. These materials are obtained by treating halosilane monomers or by treating direct process residue from the Direct Synthesis of organochlorosilanes. The Direct Synthesis of organochlorosilanes involves passing the vapor of an organic chloride over heated silicon and a catalyst. The aforementioned disilane is found in large quantities in the residue (See Eaborn), "Organosilicon Compounds, Butterworths Scientific Publications, 1960, page 1)."

The starting materials are then subjected to a treatment with a reducing agent such as lithium aluminum hydride under anhydrous conditions to obtain the polysilane (I).

Generally, the process consists of placing the reducing agent (as a slurry in a dry solvent) in a reaction vessel which is purged with an inert gas. The methylhalopolysilane in a solvent solution is then added to the slurried reducing agent over a period of time so as to control any exotherm. After the solution, the mixture can be refluxed to ensure complete reaction or can be stirred at room temperature for several hours. Any excess reducing agent can be killed by the addition of water and aqueous NaOH. The mixture can be filtered if necessary and is preferably dried using solid $MgSO_4$ and then refiltered. The resulting polymers are yellowish liquids or cream colored solids depending on the starting polymer (II).

These materials are then shaped (if desired), filled with ceramic type fillers (if desired) are fired to temperatures of 700° C. or higher in vacuo or in an inert atmosphere to obtain silicon carbide ceramic materials or silicon carbide ceramic material-containing ceramic articles.

One advantage of this polymer is its ability to be formed and shaped before pyrolysis so that one can, for example, draw fibers from the polymer and pyrolyze the fiber to obtain silicon carbide fibers. A second advantage is the ease of handling due to the absence of corrosive hydrohalides. Therefore, this invention also consists of a method of preparing a silicon carbide-containing ceramic article which consists of (A) forming an article of the desired shape from a polysilane having the average formula

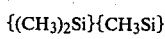

in which polysilane there is from 0 to 60 mole percent $(CH_3)_2Si\!=\!$ units and 40 to 100 mole percent $CH_3Si\!\equiv\!$ units, wherein the remaining bonds on silicon are attached to either another silicon atom or a hydrogen atom such that the polysilane contains from 0.3 to 2.1 weight percent of hydrogen attached to silicon, based on the weight of the polysilane, and (B) heating the article formed in (A) in an inert atmosphere or in a vacuum to an elevated temperature in the range of 700° C. to 1600° C. until the polysilane is converted to silicon carbide-containing ceramic article.

This invention also deals with silicon carbide-containing ceramic articles that are formed from the polysilane and ceramic fillers. It is contemplated within the scope of this invention that the ceramic articles can be in any physical form, for example, foams, fibers, threads, solid blocks and the like. These ceramics can also be used as coatings over other materials such as metal glass, alloys and other ceramics owing to the fact that the polysilanes containing ceramic fillers can be low viscosity and therefore easily applied to various surfaces.

Therefore, the invention also consists of a method of perparing a filled silicon carbide-containing ceramic article which consists of (A) mixing a polysilane with at least one conventional ceramic filler which polysilane has the average formula

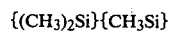

in which polysilane there is from 0 to 60 mole percent $(CH_3)_2Si\!=\!$ units and 40 to 100 mole percent $CH_3Si\!\equiv\!$ units, wherein the remaining bonds on silicon are attached to either another silicon atom or a hydrogen atom such that the polysilane contains from 0.3 to 2.1 weight percent of hydrogen attached to silicon, based on the weight of the polysilane; (B) forming an article of the desired shape from the mixture of polysilane and fillers and (C) heating the article formed in (B) in an inert atmosphere or in a vacuum to an elevated temperature in the range of 700° C. to 1600° C. until the polysilane is converted to a silicon carbide-containing ceramic article.

It is also contemplated within the scope of this invention to perpare articles which are coated with the silicon carbide ceramic materials of this invention which are then pyrolyzed to give articles coated with silicon carbide-containing ceramics. Thus, the method of preparing such an article coated with ceramic consists of (A) mixing a polysilane with at least one conventional ceramic filler which polysilane has the average unit formula

in which polysilane there is from 0 to 60 mole percent $(CH_3)_2Si\!=\!$ units and 40 to 100 mole percent $CH_3Si\!\equiv\!$ units, wherein the remaining bonds on silicon are attached to either another silicon atom or a hydrogen atom such that the polysilane contains from 0.3 to 2.1 weight percent of hydrogen attached to silicon, based on the weight of the polysilane; (B) coating a substrate with the mixture of polysilane and fillers and (C) heating the substrate in an inert atmosphere or in a vacuum to an elevated temperature in the range of 700° C. to 1600° C. until the coating is converted to a silicon carbide-containing ceramic, whereby a silicon carbide-containing ceramic coated article is obtained.

Any reducing agent which contains hydride can be used in this invention as long as it is effective in removing essentially all of the hydrolyzable halide from the starting material (II). In order to help ensure the halide removal, an excess of the reducing agent is generally used. Preferred reducing agents are lithium aluminum hydride, NaH or $NaBH_4$. Especially preferred is lithium aluminum hydride. The reducing agent is generally used in a solvent slurry. Any solvent which will allow the formation of a slurry and not cause precipitation from solvent when the addition of polymer is made, will suffice to slurry the reducing agent. Such useable solvents are those set forth below. Preferred is an ether such as dry diethyl ether.

The solvents for the methylpolysilane starting material can be any solvent in which the polysilane and the reducing agent is soluble. Such solvents therefore can be those solvents which are non-reactive to either the polysilane or the reducing agent and are easy to remove. Such solvents as xylene, toluene, benzene, tetrahydrofuran, ethers such as diethyl ether and the like are therefore useable herein. Preferred solvents are toluene and diethyl ether.

Generally, the order of addition of the materials is not essential but it has been found that the addition of the methylchloropolysilane in solvent solution, to the reducing agent in a solvent slurry, with agitation and in an inert atmosphere, is the best method of addition.

The reaction can be run at temperatures of 0° C. to 120° C. but preferably the reaction is run at 25° C.±10° C. to prevent undesirable side reactions. After the addition of the starting methylhalopolysilane is complete, the reaction mixture can be heated for a period of time at elevated temperatures up to 120° C. in order to ensure that essentially all of the polysilane has been reduced. Generally, 10–66 hours is sufficient to complete the reaction. Ten to 35 hours is preferred.

The excess reducing agent must be destroyed before further work-up of the new polymer (I) is carried out. This can be accomplished by conventional and well-known means such as the use of aqueous NaOH in the case of lithium aluminum hydride.

The reaction mixture is then filtered by conventional means.

The resulting filtrates are colorless liquids and when the solvents are removed they are generally yellowish liquids or cream colored solids depending on the molecular weight of the starting polymer.

In some cases, the dried materials are pyrophoric in nature.

The resulting materials are then formed into shapes such as by melt spinning and fired at elevated temperatures to yield silicon carbide ceramic materials.

Filled silicon carbide ceramic materials can be made by adding fillers and adjuvants to the polysilane before firing.

For example, fine silicon carbide, silicon nitride, oxides, silica, glass, alumina and silicates can be used as fillers in the polysilanes of this invention and when the mixture is fired, high strength ceramic articles result. Preferred are powdered silicon carbide and silicon nitrides.

Fillers and adjuvants can be milled on 3 roll mills by simply mixing the polysilanes of this invention with the fillers and making several passes on the mill. The mixture is then shaped to the desired form and then fired to prepare the silicon carbide ceramic article.

"Forming a shape" for purposes of this invention means any manner in which a shape can be formed and held such as molding, spinning, coating and drawing.

Usually, the materials of this invention, whether filled or unfilled, are heated to 700° C. and above to ceramify them. Generally, 1600° C. is usually the hottest temperature required to convert the polysilanes to silicon carbide ceramic materials. Thus, heating the polysilanes from 700° C. to 1600° C. will suffice to give optimum physical properties in the final ceramic product.

The following examples are for purposes of illustration only and are not intended to limit the scope of this invention.

Titration of chloride ion in these examples was carried out in a solution of toluene and isopropanol (essentially non-aqueous) using a 0.1% solution of tetrabromophenophthalein ethyl ester in methanol/toluene. Titration was carried out using 0.5 N KOH in ethanol.

EXAMPLE 1

Seven hundred fifty grams of methylchlorodisilane having a boiling point of 150°–154° C. was treated with 8.5 grams of $(C_4H_9)_4PCl$, in a reaction vessel under argon, with agitation. Using a heating mantle the reaction vessel was heated up to 100° C. whereupon distillation ensued. The temperature was raised gradually over several hours to 150° C. and then to 285° C. in 25° C. increments over a 1-1½ hour period. The resulting polymer having 91 mole percent $CH_3Si\equiv$ units and 9 mole percent $(CH_3)_2Si=$ units and about 15 weight percent chloride content was a bright yellow glassy material with some small amount of fluid polymer wetting its surface. Six hundred thirty-eight and five tenths grams of distillate was recovered leaving 111.5 grams of polymer.

This polymer was dissolved in 300 ml. of dry toluene and was then added dropwise to a slurry of 20 grams of $LiAlH_4$ in 400 mls of absolute ether in about 15 minutes (0.47 g. moles of Cl and 0.53 moles of $LiAlH_4$). The reaction mixture was stirred overnight at room temperature.

Ethyl acetate (186 grams) was added to the stirred slurry cautiously to kill the remaining lithium aluminum hydride. The slurry was then stirred for ½ hr. The material was suction filtered. The filtrate was stripped with agitation and moderate heating to yield a cream colored solid which burst into flame when exposed to air. The material was rediluted in dry toluene at 50 weight percent solids and stored under dry nitrogen. The polymer contains 0.4 weight % of hydrogen as SiH and had 91 mole percent $CH_3Si\equiv$ units and 9 mole percent $(CH_3)_2Si=$ units.

EXAMPLE 2

A 500 ml. round-bottomed flask was equipped with a mechanical stirrer, heating mantle and addition funnel and after purging with argon there was added to the vessel 5.13 grams of lithium aluminum hydride in 150 mls of dry ether. Twenty grams of polymer, prepared as in Example 1 except the distillation after the addition of the $(C_4H_9)_4PCl$ catalyst was terminated at 150° C., containing 38.44 weight percent hydrolyzable chlorine, was dissolved in 125 ml of dry ether and was added to the addition funnel. The polymer solution was dripped into the slurry of excess lithium aluminum hydride over several hours. The reaction mixture was allowed to stir for two days. Five mls of water was dripped in slowly followed by 5 mls of 15% aqueous NaOH followed by 15–20 mls of water. This mixture was stirred for several hours, filtered, dried using $Na_2SO_4$ and refiltered to yield a clear colorless ether solution. % residual Cl=1.6%. IR showed SiH, $SiCH_3$ and a small amount of Si-O-Si.

EXAMPLE 3

Another material was prepared as in Example 1 except the distillation after the addition of the $(C_4H_9)_4PCl$ catalyst was terminated at 250° C. Using apparatus similar to the above examples, 31 grams of this polymer was reduced with lithium aluminum hydride (5 grams) over a 30 minute period. The reaction mixture was then stirred overnight at room temperature (approximately 16 hours). The excess $LiAlH_4$ was destroyed by water and NaOH and the material was filtered, dried using $Na_2SO_4$, and stripped to yield a very pale yellow oil. %Cl was 0.68%.

EXAMPLE 4

Five grams of $LiAlH_4$ was transferred to a 500 ml. round-bottomed flask equipped as in the preceding examples. The system was flushed with $N_2$ and 20 grams of chlorine containing polymer similar to that in Example 3 was dissolved in 100 mls of dry toluene. Small amounts of insoluble hydrolysis products separated. The solution was decanted into an addition funnel and was then added to the $LiAlH_4$ over a 20 minute period. The slurry was stirred overnight and was then treated with water and NaOH to kill the $LiAlH_4$. The reaction mass was stirred 1-2 hours, filtered and dried using $Na_2SO_4$, refiltered and evaporated to dryness to yield a whitish pale yellow solid. % carbon=$24.75\pm0.23$ and %H=$6.02\pm0.1$. 0.379% Cl (residual). 0.9889 grams of this material was fired to 1200° C. under argon in a graphite crucible to give 0.6267 grams of solid material which was essentially beta-silicon carbide.

EXAMPLE 5

Another material was prepared as in Example 1 except the distillation after the addition of the $(C_4H_9)_4PCl$ catalyst was terminated at 275° C. One hundred ninety-nine grams of this polymer was diluted to 50% solids using dry toluene. Ten grams of $LiAlH_4$ were added using 100 mls of diethyl ether. The slurry warmed slightly and was stirred about 35 hours at room temperature and the reducing agent was killed using water and aqueous 15% NaOH and the material was filtered and evaporated to dryness to yield 135.0 grams of off-white soluble polymer (78% yield). The polymer contained 0.45 weight % hydrogen as SiH.

EXAMPLE 6

This material was prepared as in Example 1 except the distillation after the addition of the $(C_4H_9)_4PCl$ was terminated at 250° C.

Sixty-seven and four tenths grams of the above polymer was diluted to 50% solids in dry toluene and was added to 11 grams of $LiAlH_4$ in dry ether (250 ml) under an argon blanket. The addition took 1 hour and a slow reflux was observed. The reaction mass was then stirred overnight (about 16 hours) at room temperature. The $LiAlH_4$ was killed using water and aqueous NaOH. It was stirred overnight (about 16 hours) after adding 250 mls of diethyl ether to the new viscous, greyish colored material. The material was filtered, dried as before only using $MgSO_4$ and refiltered and then evaporated to dryness. Chlorine content was nil. %SiH=0.45 weight %.

EXAMPLE 7

The material of Example 6 was subjected to a controlled heating cycle during pyrolysis to show the enhanced yields of silicon carbide by the use of the instant invention.

The thermogravimetric analysis was run on a Netzsch STA 429 thermal gravimetric analyzer (Netzsch Instruments, Selb, West Germany). It was run on a 49.3 mg sample with an argon flow rate of 0.2 and a time rate of heating of 5° C./min. A 78.6% yield was obtained up to a temperature of 1555° C.

In comparison, Yajima et al. reports a yield of about 60% of silicon carbide from their polycarbosilane polymers at temperatures of up to 1300° C. (Nature, vol. 261, No. 5562, pages 683–685 (1976)).

EXAMPLE 8

The material of Example 4 was also subjected to thermogravimetric analysis (TGA) on a Netzsch thermal gravimetric analyzer in order to determine percent yield of silicon carbide. The carrier gas was argon, heating rate was 2° C./min. and the sample size was 45.5 mg.

| Temp. °C. | Weight loss % |
|---|---|
| 25–250 | 2.2 |
| 250–358 | 0.7 |
| 358–442 | 1.3 |
| 442–767 | 4.3 |
| 767–1086 | 1.5 |
| 1086–1558 | 0.4 |

Total weight loss was 10.4% up to a temperature of 1558° C. This is a yield of silicon carbide of 89.6%. X-ray diffraction showed the material to have an average of 60 Å particle size with some minor amount of silicon carbide in the 160 Å range.

EXAMPLE 9

A material was prepared essentially as in Example 1 by using 559.5 grams of direct process residue and 5.6 grams of tetrabutylphosphonium chloride. The materials were heated at 100° C. for ½ hour then to 250° C. for 1 hour. Four hundred seventy and three tenths grams of distillate was recovered. The chlorine content was 12.22%. Typical direct process residue has about fifty-two weight percent chlorine in it. This material was dissolved in 159 grams of dry toluene to give 35.9% solids. This material was then added to lithium aluminum hydride (10.0 grams) in 200 ml of diethylether under an argon blanket and stirred overnight. Then 10 grams of water and 0.1 gram of 15% NaOH and 0.3 grams of water was added. The organic material was decanted and dried with $MgSO_4$ and the material was gravity filtered. It was then stripped, yielding polysilane containing 0.40 weight % hydrogen as SiH. This material (24.96 grams) was filled with 100.09 grams of 1-5 micron alpha-silicon carbide by blending under argon in a Baker-Perkins mixer, using a small amount of toluene. After 1½ hours, the blend was removed and evaporated to dryness to a temperature of 50°–60° C. This dry solid was fired to 1200° C. under a programmed TGA as in Example 8 whereupon a ceramic was formed in a yield of 84.2

That which is claimed is:

1. A method of preparing a polysilane having the average formula

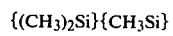

$\{(CH_3)_2Si\}\{CH_3Si\}$     (I)

in which polysilane there is from 0 to 60 mole percent $(CH_3)_2Si=$ units and 40 to 100 mole percent $CH_3Si\equiv$ units, wherein the remaining bonds on silicon are attached to either another silicon atom or a hydrogen atom such that the polysilane contains from 0.3 to 2.1 weight percent of hydrogen attached to silicon, based on the weight of the polysilane, which method consists of (A) reducing a polysilane having the average formula $$\{(CH_3)_2Si\}\{CH_3Si\} \qquad (II)$$

in which there is from 0 to 60 mole percent $(CH_3)_2Si=$ units and 40 to 100 mole percent $CH_3Si\equiv$ units, wherein the remaining bonds on silicon are attached to either another silicon atom, a chlorine atom or a bromine atom such that the polysilane contains from 10–43 weight percent, based on the weight of the polysilane, of hydrolyzable chlorine or 21–62 weight percent based on the weight of the polysilane of hydrolyzable bromine, with at least a stoichiometric quantity, based on the halogen present, of a reducing agent, under anhydrous conditions, at a temperature of from 0° to 120° C. for a period of from 4 to 48 hours., in a suitable solvent, and (B) thereafter recovering the polysilane (I).

2. A composition of matter consisting essentially of a polysilane having the average formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein the remaining bonds on silicon are attached to either another silicon atom or a hydrogen atom such that the polysilane contains from 0.3 to 2.1 weight percent of hydrogen attached to silicon, based on the weight of the polysilane.

3. A method of preparing silicon carbide ceramic materials which consists of heating a polysilane having the average formula $$\{(CH_3)_2\}\{CH_3Si\}$$

in which polysilane there is from 0 to 60 mole percent $(CH_3)_2Si=$ units and 40 to 100 mole percent $CH_3Si\equiv$ units, wherein the remaining bonds on silicon are attached to either another silicon atom or a hydrogen atom such that the polysilane contains from 0.3 to 2.1 weight percent of hydrogen attached to silicon, based on the weight of the polysilane, in an inert atmosphere or in a vacuum to an elevated temperature in the range of 700° C. to 1600° C. until the polysilane is converted to silicon carbide.

4. Silicon carbide ceramic materials prepared by the method as claimed in claim 3.

5. A method of preparing a silicon carbide-containing ceramic article which consists of (A) forming an article of the desired shape from a polysilane having the average formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein the remaining bonds on silicon are attached to either another silicon atom or a hydrogen atom such that the polysilane contains from 0.3 to 2.1 weight percent of hydrogen attached to silicon, based on the weight of the polysilane, and (B) heating the article formed in (A) in an inert atmosphere or in a vacuum to an elevated temperature in the range of 700° C. to 1600° C. until the polysilane is converted to a silicon carbide-containing ceramic article.

6. The silicon carbide-containing ceramic article prepared by the method of claim 5.

7. A method of preparing a filled silicon carbide-containing ceramic article which consists of (A) mixing a polysilane with at least one conventional ceramic filler which polysilane has the average formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein the remaining bonds on silicon are attached to either another silicon atom or a hydrogen atom such that the polysilane contains from 0.3 to 2.1 weight percent of hydrogen attached to silicon, based on the weight of the polysilane;

(B) forming an article of the desired shape from the mixture of polysilane and fillers and, (C) heating the article formed in (B) in an inert atmosphere or in a vacuum to an elevated temperature in the range of 700° C. to 1600° C. until the polysilane is converted to a silicon carbide-containing ceramic article.

8. The Article prepared by the method of claim 7.

9. A method of preparing an article coated with ceramic which consists of (A) mixing a polysilane with at least one conventional ceramic filler which polysilane has the average unit formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein the remaining bonds on silicon are attached to either another silicon atom or a hydrogen atom such that the polysilane contains from 0.3 to 2.1 weight percent of hydrogen attached to silicon, based on the weight of the polysilane, (B) coating a substrate with the mixture of polysilane and filler and, (C) heating the coated substrate in an inert atmosphere or in a vacuum to an elevated temperature in the range of 700° C. to 1600° C. until the coating is converted to a silicon carbide ceramic, whereby a silicon carbide-containing ceramic coated article is obtained.

10. An article prepared by the method of claim 9.

* * * * *

UNITED STATES PATENT AND TRADEMARK OFFICE
CERTIFICATE OF CORRECTION

PATENT NO. : 4,310,482
DATED : January 12, 1982
INVENTOR(S) : Ronald H. Baney

It is certified that error appears in the above-identified patent and that said Letters Patent is hereby corrected as shown below:

In column 2, line 49, "$[(CH_3)_2][CH_3Si]$" should read -- $[(CH_3)_2Si]$ --.

In column 3, line 34, "solution" should read -- addition --.

In column 6, line 24, "chloride" should read -- chlorine --.

In column 8, line 19, "45.5" should read -- 45.4 --.

In column 8, line 62, "84.2" should read -- 84.2%. --.

In column 9, line 44, "$[(CH_3)_2][CH_3Si]$" should read -- $[CH_3Si]$ --.

Signed and Sealed this

Twenty-sixth Day of February 1985

[SEAL]

Attest:

DONALD J. QUIGG

Attesting Officer    Acting Commissioner of Patents and Trademarks